(12) United States Patent
Hannweber et al.

(10) Patent No.: US 8,829,889 B2
(45) Date of Patent: Sep. 9, 2014

(54) LASER-PROTECTIVE WALL ELEMENT FOR A HOUSING IN LASER MACHINING STATIONS

(75) Inventors: Jan Hannweber, Dresden (DE); Stefan Kuehn, Amtsberg (DE); Sven Bretschneider, Dresden (DE); Michael Melde, Dresden (DE)

(73) Assignee: Fraunhofer-Gesellschaft zur Foerderung der Angewandten Forschung E.V., München (DE)

( * ) Notice: Subject to any disclaimer, the term of this patent is extended or adjusted under 35 U.S.C. 154(b) by 1246 days.

(21) Appl. No.: 12/672,428

(22) PCT Filed: Aug. 7, 2008

(86) PCT No.: PCT/EP2008/006528
§ 371 (c)(1),
(2), (4) Date: Jun. 16, 2010

(87) PCT Pub. No.: WO2009/019020
PCT Pub. Date: Feb. 12, 2009

(65) Prior Publication Data
US 2011/0260737 A1    Oct. 27, 2011

(30) Foreign Application Priority Data

Aug. 8, 2007  (DE) .......................... 10 2007 038 780
Nov. 6, 2007  (DE) .......................... 10 2007 054 285

(51) Int. Cl.
*G01R 31/00*    (2006.01)
*F16P 1/06*    (2006.01)
*B23K 26/30*    (2014.01)

(52) U.S. Cl.
CPC  *B23K 26/427* (2013.01); *F16P 1/06* (2013.01)
USPC .................... 324/96; 250/515.1; 219/121.86; 219/121.6; 340/557

(58) Field of Classification Search
CPC ... B23K 26/428; B23K 26/427; B23K 23/032
USPC .................................. 219/121.86; 250/515.1
See application file for complete search history.

(56) References Cited

U.S. PATENT DOCUMENTS 3,947,837 A * 3/1976 Bitterice ........................ 340/550
4,367,460 A * 1/1983 Hodara ......................... 340/550

(Continued)

FOREIGN PATENT DOCUMENTS

DE    32 46 290    6/1983
DE    36 38 874    5/1987

(Continued)

*Primary Examiner* — Richard Isla Rodas
(74) *Attorney, Agent, or Firm* — Fay Kaplun & Marcin, LLP

(57) ABSTRACT

A laser protective wall element for a housing in laser machining stations with which increased protection, in particular for the eyes of living beings, can be achieved. In a laser protective wall element for a housing at laser machining stations, an intermediate layer is present which has hot conductor properties. The intermediate layer can be formed between electrically conductive plate-like elements, an electrically conductive plate-like element and an electrically conductive coating or also two electrically conductive layers or can be arranged there. The electrically conductive plate-like elements, the coating and/or the layers are connected to an electrical voltage source as well as a measuring instrument which detects electrical current, electrical resistance and/or electrical capacity and whose measured signal change can be used for the condition monitoring of the laser protective wall element.

17 Claims, 2 Drawing Sheets

(56) References Cited

U.S. PATENT DOCUMENTS

| | | | |
|---|---|---|---|
| 4,556,875 A | | 12/1985 | Ishiwatari |
| 4,575,610 A | * | 3/1986 | Gavin .................. 219/121.6 |
| 4,901,738 A | * | 2/1990 | Brink et al. .............. 128/849 |
| 5,151,095 A | * | 9/1992 | Teeple, Jr. ................... 606/2 |
| 7,394,060 B2 | * | 7/2008 | Beinhocker ............ 250/227.14 |
| 8,026,457 B2 | * | 9/2011 | Wilhelmi et al. ........ 219/121.6 |
| 8,416,820 B1 | * | 4/2013 | Ward ..................... 372/38.07 |

FOREIGN PATENT DOCUMENTS

| | | |
|---|---|---|
| DE | 89 08 806 | 8/1989 |
| DE | 100 17 284 | 6/2001 |
| FR | 2 411 294 | 7/1979 |

* cited by examiner

LASER-PROTECTIVE WALL ELEMENT FOR A HOUSING IN LASER MACHINING STATIONS

FIELD OF INVENTION

The invention relates to a laser protective wall element for a housing in laser machining stations with which increased protection, in particular for the eyes of living beings, can be achieved.

BACKGROUND INFORMATION

In the past, the demands on protective equipment against laser radiation in laser machining was increased, which was in particular the case as the result of the increased beam qualities and power densities achievable with fiber lasers and disc lasers.

A distinction is made between passive protective equipment and active protective equipment in this respect. With passive protective equipment, changes in or the destruction of materials are registered which occur as a result of the energy conversion into heat. In this respect, as a rule, penetration of wall elements provided for this purpose can also occur. As a rule, only a visual examination takes place in this respect subsequent to a machining with laser radiation which has to be carried out at more or less wide time intervals, which causes a correspondingly high effort and/or expense and no 100% security can be ensured.

Sufficiently secure protective walls and required support constructions therefore have to be manufactured with a high and cost-intensive use of material.

However, different active protective equipment is also known which is based on different principles. Optical systems are thus known with which specific changes such as gas formation can be detected. Another possibility is the detection of a change in an internal pressure or in a leak in or from hollow spaces which can occur with a double-wall design. It is obvious in this respect that the leak tightness is in particular problematic when an underpressure is present in such hollow spaces or when a fluid is contained in them.

Protective equipment is known from DE 36 38 874 C2 and DE 89 08 806 U1 in which electrical conductors are formed between layers and through which an electrical current flow takes place. If such an electrical conductor is parted as a consequence of melting, electrical current can no longer flow, which should then result in a deactivation of the laser. It is very complex and/or expensive in this respect to form the electrical conductors and in so doing accepting losses which are as small as possible. Even if the electrical conductors are designed in meandering form, gaps, that is, regions in which no electrical conductor is present, cannot be avoided, which is also critical with small beam cross-sections of high-power lasers which on incidence do not cause a parting of such an electrical conductor with sufficient security.

After parting an electrical conductor, this system is no longer operable and the security is only present again after replacement or complex and/or expensive repair.

A destruction of the protective equipment is necessary to determine a danger in all known active protective equipment.

SUMMARY OF INVENTION

In accordance with the invention, at least one intermediate layer is present in a laser protective wall element for a housing at laser machining stations. The intermediate layer in this respect has hot conductor properties. This means that the specific electrical resistance is considerably higher at lower temperatures, that is, in the range of common room temperatures or environmental temperatures, than at temperatures which are higher in comparison. There is a plurality of alternatives for the design and arrangement of the at least one intermediate layer. The intermediate layer can in this respect be arranged in an embodiment in accordance with the invention between two electrically conductive plate-like elements so that it separates them from one another.

In a further embodiment of the invention, the intermediate layer can be formed on an electrically conductive plate-like element and an electrically conductive coating can then be formed on the intermediate layer.

There is, however, also the possibility in the invention to form the intermediate layer between two electrically conductive layers. Such a layer system can then be applied to a support element, for example to a window element.

The plate-like elements, for example metal sheets of aluminum or another metal, the electrically conductive coating or the electrically conductive layers are connected to an electrical voltage source. Under normal conditions, no electrical current or only a very small electrical current can thus flow over the intermediate layer between the plate-like element(s), the coating and/or the layers. A measuring instrument, preferably connected is series, is moreover present with which a measured signal change can be detected for the condition monitoring of the laser protective wall elements. A change in the electrical current, in the electrical resistance and/or in the electrical capacity can thus be detected.

If a laser beam is incident on one of the plate-like elements, the coating, the layers or a support element, a heating occurs, which is admittedly locally limited, which can lead up to and into a temperature range of approximately 600° C. and beyond. The specific electrical resistance is reduced in this region of the housing and the electrical current increases accordingly, which can be detected and which can be utilized in the protection against laser radiation in the environment of a laser machining station.

There is thus the possibility to permanently monitor the electrical current and/or the electrical voltage at the laser protective wall, which can be connected by means of a measurement circuit suitable for this purpose which is a component of an electronic evaluation and control unit or is connected thereto. If a measured signal change, for example a change in the flowing electrical current and/or in the electrical voltage, is detected which exceeds a predetermined threshold value, at least one signal can be generated. A deactivation of a laser which is arranged within the housing at a laser machining station or is utilized there by means of beam guidance elements and/or beam shaping elements can take place using this signal.

However, at least one warning signal can be generated alone or in addition with which the danger situation is signalized acoustically and/or visually.

The threshold value which can be taken into account for this purpose can be dependent on the respective material from which or with which the intermediate layer is formed, on its thickness and on the electrical values that is, those of the electrical voltage source to which the plate-like elements, the coating and/or the layers are connected, and can be selected while taking these parameters into account.

A laser protective wall can be formed with at least one laser protective wall element which has the two electrically conductive plate-like elements separated from one another by the intermediate layer, a plate-like element provided with a coating or a support element provided with layers. There is, however, also the possibility to use a plurality of such laser protective wall elements for a housing which can be arranged next to one another or above one another. A laser protective wall element can also be designed in the form of a door which can be a component of a housing.

It is advantageous in this respect to dimension and arrange the laser protective wall elements or also a plurality of laser protective walls such that outer margins of laser protective wall elements arranged next to one another or above one another overlap so that a secure protective can also be achieved in these otherwise critical regions. Doors at laser machining stations can also likewise be formed in accordance with the invention. An access possibility can also be ensured with roll-up doors. In this respect, the individual panels of roll-up doors can be designed analogously in the form of a laser protective wall.

A laser protection wall element in accordance with the invention can moreover have at least one further outer wall element which is likewise plate-like and which can be aligned parallel to one another like the plate-like elements. An outer wall element can also have a surface of a three-dimensional structure. An outer wall element can in this respect be arranged at the inner side and/or outer side of the laser protective wall with respect to a laser machining station. If an outer wall element is formed from electrically conductive material, a spacing from a plate-like element or an electrical insulation with a dielectric separating layer should be present. With a spacing, at least one hollow space is formed with which an improved thermal and acoustic absorbing effect can be achieved. A separating layer can in this respect likewise be designed in the form of one or more plates and spacings causing hollow spaces can moreover also be present between a plurality of plates so that plates or also other suitable bodies can form spacers.

The intermediate layer present in accordance with the invention should have a constant layer thickness and consistency over the total surface so that the same electrical properties are present at every position. It can thereby be ensured that the already mentioned generation of at least one signal takes place under the same conditions.

An intermediate layer having hot conductor properties can be formed from different materials, substances and substance mixtures. It is particularly favorable in this respect if the electrically conductive plate-like elements can be simultaneously connected to one another with material continuity by means of the intermediate layer. This is, for example, possible with an adhesive connection for which an intermediate layer can be formed with a suitable binder. There is, however, also the possibility of forming an intermediate layer and a connection with material continuity by sintering. An application in a sol gel technique by evaporation coating, spraying, deposition welding or an adhesive bonding of a film is also possible.

Intermediate layers can be formed with suitable metal oxides (e.g. magnesium oxide, silicon oxide, $Fe_2O_4$). They can also be present as a mixture of at least two metal oxides. Such oxide layers can, however, also form intermediate layers in the sense of the invention on metal sheets, as electrically conductive plate-like elements. They can be layers obtained by bluing or also anodized layers (e.g. on aluminum). A bluing on a plate-like element of iron or of an iron alloy and an anodized layer on aluminum or on an aluminum alloy can thus form an intermediate layer. Such intermediate layers can therefore be formed by a material conversion or material modification.

Electrically conductive coatings or layers can be formed with already named processes. Electrically conductive layers can thus be formed in known thin-film technology, for example using CVD or PVD processes. As already addressed, thin layers can also be formed on support elements. An optically transparent window element can be such a support element in this respect. The electrically conductive layers and the intermediate layer can then be formed with layer thicknesses thereon which ensure that the optical transparency is maintained at least within the wavelength range of visible light. A laser protective window formed in this manner can then likewise be monitored and defects which have occurred or a destruction can be recognized.

In an alternative in accordance with the invention, a plate-like element with an intermediate layer can also have an electrically conductive coating. Such a coating can be an electrically conductive lacquer which has electrically conductive particles in a polymer matrix. The particle density, their size and number should ensure sufficient electrical conductivity. In this respect, commercial electrically conductive lacquers can be used such as one which is available under the trade name AUROMAL from AMI Doduco GmbH.

The application of an electrically conductive lacquer can take place in the most varied form, for example by spin-coating, scraping on or screen printing.

An intermediate layer can, however, also be formed by a suitable ceramic material such as a silicate ceramic which has hot conductor properties.

There is, however, also the possibility of using semiconductors, in particular polycrystalline semiconductors, of at least one sinterable metal oxide, preferably two sinterable metal oxides, or also $Zn_2TiO_4$ for intermediate layers. Electrically conductive polymers for intermediate layers can also be used.

Polymers having hot conductor properties can, however, also be used for an intermediate layer.

Intermediate layers can also be formed with polymeric or inorganic binders which can be formed with aluminum or with magnesium oxide to achieve the hot conductor properties.

An intermediate layer having a support structure can be formed between the two electrically conductive plate-like elements which separates the plate-like elements from one another and can preset a spacing of the plate-like elements. Such a support structure can preferably be integrated in an intermediate layer having a material, substance or substance mixture having hot conductor properties.

A support structure can be formed with a fabric or knitted fabric, e.g. a fiber composite, formed with fibers. It can be interspersed with a material, substance or substance mixture having hot conductor properties, which can be achieved, for example, by soaking before a joining of the two plate-like elements.

At a temperature of 20° C., it should have a specific electrical resistance of at least $10^{10}$ $\Omega$cm, which reduces to a value of least $10^8$ $\Omega$cm at a temperature of 600° C.

It can be magnesium oxide, for example, whose specific electrical resistance at 20° C. lies at $10^{14}$ $\Omega$cm and at 600° C. at $10^9$ $\Omega$cm.

With aluminum oxide, the specific electrical resistance at 20° C. lies at $10^{12}$ $\Omega$cm and at 600° C. at $10^6$ $\Omega$cm.

For an alumina porcelain C 120, the specific electrical resistance at 20° C. lies at $10^{11}$ $\Omega$cm and at 600° C. at $10^3$ $\Omega$cm.

The advantages of active protection come into effect with the laser protective wall in accordance with the invention. Nevertheless, however, a single deposition of laser radiation onto a position of the housing at least does not result in a total failure of the functionality, even if the intermediate layer has been destroyed or damaged at this position so that hot conductor properties are no longer present there. Other surface regions are then still functional and the housing can continue to be utilized with security which is limited extremely slightly. A complex and/or expensive repair or even replacement is only required with a large-area impairment.

Some materials, substances or substance mixtures which can be used for intermediate layers, however, also remain resistant at a high degree of heating and maintain their properties so that no loss in security can be noted.

A laser protective wall in accordance with the invention, composed completely of or also of a plurality of such elements, can represent a self-supporting structure and an additional support construction can thus be dispensed with.

The invention should be explained in more detail by way of example in the following.

BRIEF DESCRIPTION OF DRAWINGS

There are shown.

DETAILED DESCRIPTION

Figure 1:
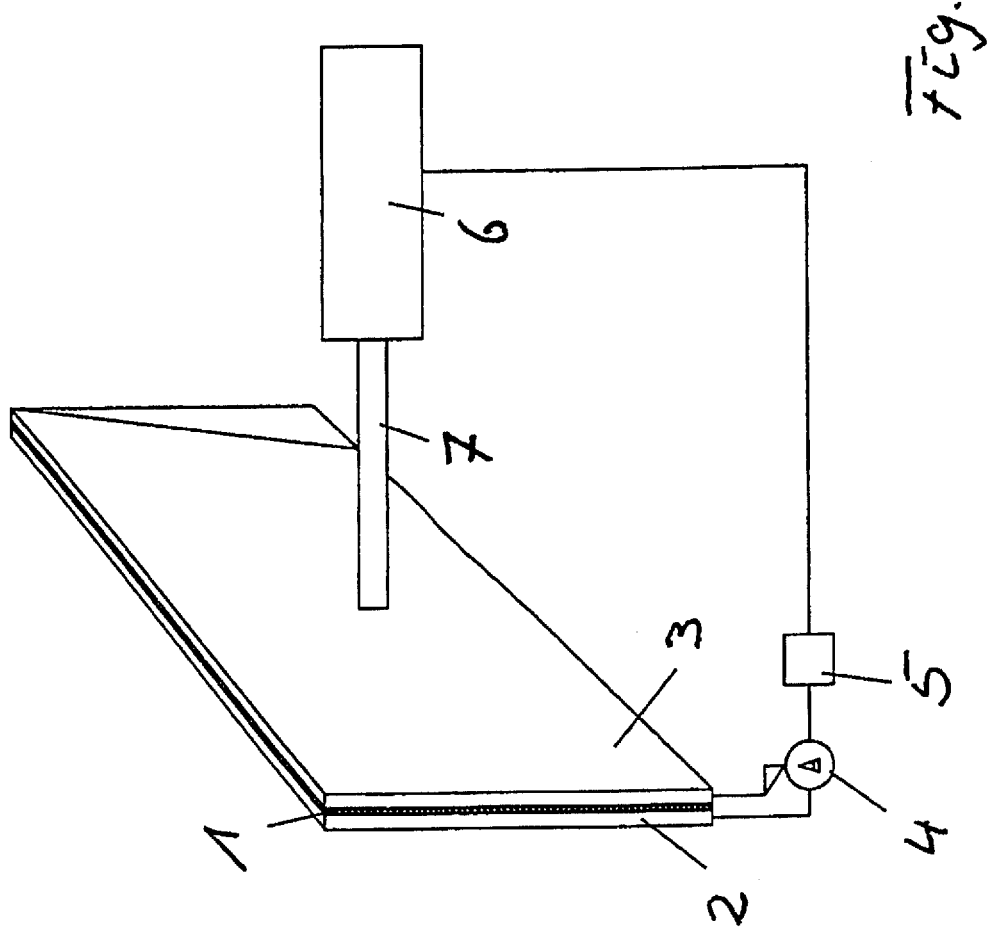
FIG. 1 a laser protective wall element for a laser protective wall in schematic form.

In the laser protective wall element shown in FIG. 1, which can be used at an example of a housing in laser machining stations, two metal sheets formed from zinc-plated steel are connected to one another with material continuity and over the full area as electrically conductive plate-like elements 2 and 3 by a binder which has hot conductor properties. The binder forms the intermediate layer 1. A binder which is available from POLYTEC PT GmbH, Waldbronn, Del., under the trade name Resbond 906, was used as the binder. The thus formed intermediate layer 1 had a thickness between the two plate-like elements 2 and 3 of 1 mm±0.5 mm. In addition, a glass fabric is embedded in the intermediate layer 1 as a spacer. The steel metal sheets, as plate-like elements 2 and 3, have dimensions of 1000 mm×1000 mm×1 mm.

An electrical voltage to the amount of 24 V was applied to the two steel metal sheets, as plate-like elements 2 and 3, and the flow of the electrical current between the two metal sheets, as electrically conductive plate-like elements 2 and 3, is determined at different temperatures to be able to demonstrate the suitability for a laser protective wall in accordance with the invention.

The following values were able to be determined in this respect:

At a temperature of 20° C., an electrical amperage I of 0.5 mA was measured with the measuring instrument 4.

A locally limited increase in the temperature to 600° C. was effected using the laser beam 7 which is incident onto the inner plate-like element 3 from a laser 6. The electrical current increased in this respect to 3 mA, which can be detected as a measured signal change. An electronic evaluation and control unit 5 can be set so that such a measured signal change is recognized as an exceeding of a threshold value and a signal is then generated for the deactivation of the laser 6. The threshold value can in this respect be selected so that such a signal is generated from the reaching of a temperature of 200° C. onward.

It is thus possible to understand that the invention is sufficiently secure and a generation of signals, as already addressed in the general part of the description, for laser radiation protection can take place at presettable threshold values and false activations can be reliably avoided in this respect.

Figure 2:
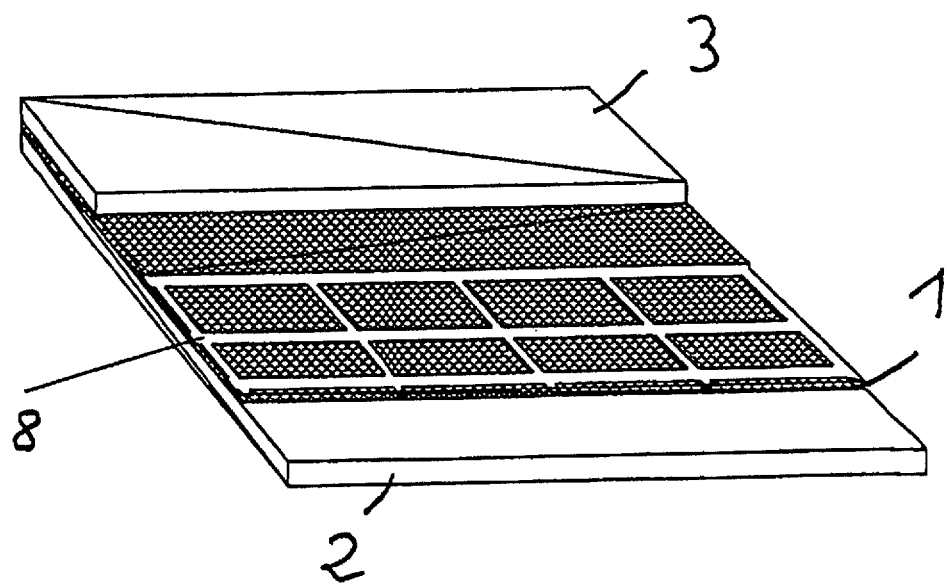
FIG. 2 a laser protective wall element for a laser protective wall with a support structure.

A laser protective wall element with an additionally integrated support structure 8 which can be used for a laser machining station is shown in FIG. 2.

The invention claimed is:

1. A laser protective wall element for a housing in a laser machining station, comprising:
   first and second electrically conductive plate-like elements; and
   an intermediate layer arranged between the first and second electrically conductive plate-like elements separating them from one another, the intermediate layer having electrical hot conductor properties,
   wherein the first and second electrically conductive plate-like elements are connected to an electrical voltage source and a measuring instrument which detects a measured signal change of at least one of an electrical current, an electrical resistance and an electrical capacity, and
   wherein a condition of the laser protective wall element is being monitored as a function of the measured signal change;
   a laser generating unit configured to generate a laser beam; and
   an electronic evaluation and control unit configured to generate at least one of a deactivation signal for the laser generating unit and a warning signal to take place when the measured signal change exceeds a predetermined threshold value.

2. The laser protective wall element of claim 1, further comprising:
   a plate-like outer wall element parallel to one of the first and second electrically conductive plate-like elements and a coated plate-like element.

3. The laser protective wall element of claim 2, wherein the plate-like outer wall element is separated from an adjacent one of at least one of the first and second plate-like elements by one of a space and a dielectric separating layer.

4. The laser protective wall element of claim 1, wherein the intermediate layer has a constant layer thickness and consistency over the total surface.

5. The laser protective wall element of claim 1, wherein the intermediate layer is a binder which has hot conductor properties and with which the first and second plate-like elements are connected to one another with material continuity.

6. The laser protective wall element of claim 1, wherein the intermediate layer is formed by at least one of a metal oxide, a mixture of metal oxides and a polymer having hot conductor properties.

7. The laser protective wall element of claim 1, wherein the intermediate layer is formed by a binder including one of aluminum oxide and magnesium oxide.

8. The laser protective wall element of claim 1, wherein the intermediate layer is formed by a polycrystalline semiconductor of at least one sinterable metal oxide.

9. The laser protective wall element of claim 1, wherein the intermediate layer is formed with one of $Fe_2O_4$ and $Zn_2TiO_4$.

10. The laser protective wall element of claim 1, wherein the first and second electrically conductive plate-like elements are separated from one another by the intermediate layer and a dielectric support structure.

11. The laser protective wall element of claim 10, wherein the support structure is one of a fabric and a knitted fabric which is formed with fibers and which is interspersed with the substance forming the intermediate layer.

12. The laser protective wall element of claim 1, further comprising:
   at least one further laser protective wall element, the laser protective wall element and the at least one further laser protective wall element being arranged at least one of next to one another and above one another with outer margins of the laser protective wall element and the at least one further laser protective wall element that are adjacent one another overlapping.

13. The laser protective wall element of claim 1, wherein the intermediate layer has a specific electrical resistance of at least $10^{10}$ Ωcm at a temperature of 20° C. which reduces to a value of at least $10^{8}$ Ωcm at a temperature of 600° C.

14. The laser protective wall element of claim 1, wherein one of the first and second plate-like elements is formed of one of iron and an iron alloy and includes a bluing as the intermediate layer.

15. The laser protective wall element of claim 1, wherein the first and second plate-like elements are of one of aluminum and an aluminum alloy and the intermediate layer is provided with an anodized layer.

16. The laser protective wall element of claim 1, wherein the coating is formed with an electrically conductive lacquer.

17. The laser protective wall element of claim 1, wherein the electrically conductive layers and the intermediate layer are formed on a window element with a thickness so that they are optically transparent in the wavelength range of visible light.

* * * * *